Patented June 17, 1947

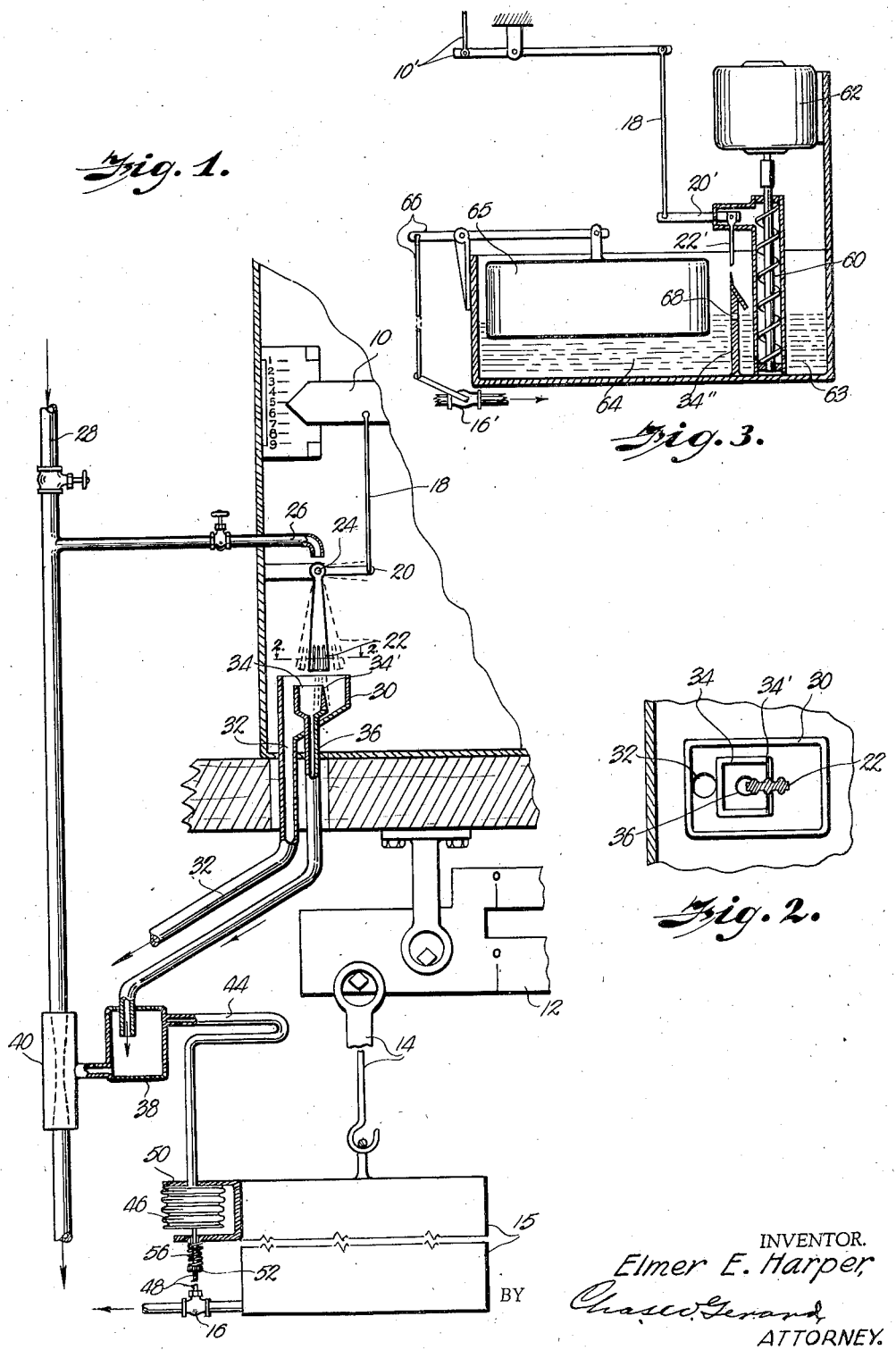

2,422,352

UNITED STATES PATENT OFFICE 2,422,352

CONTROL MEANS FOR AUTOMATIC REGULATING MECHANISM

Elmer E. Harper, Monrovia, Calif.; Esther Pardee Harper executrix of said Elmer E. Harper, deceased Application May 17, 1944, Serial No. 535,976

5 Claims. (Cl. 60—60)

The present invention relates to control or regulating means of a type responding to control conditions and provided with means for imparting appropriate regulating action to other devices or operating means for the purpose of varying the operation thereof in accordance with the set conditions of control.

Accordingly it is a primary object of my invention to devise control means of such a character as will comprise control mechanism directly responsive to control conditions or actuations, and include means operative to transmit the appropriate regulating action to other regulative devices or operating means, and with little reactive influence tending to disturb the sensitiveness of the operations of said control mechanism.

As one method of accomplishing this purpose I have devised a control system which comprises a control means responsive to the control conditions and actuated thereby to impress a control function upon a continuous liquid flow in such a manner as to divert proportionate amounts or fractions of said flow which are thereafter utilized for the carrying out of the desired adjustment or regulation of the mechanism or devices to be controlled.

In the actual construction and operation of my improved control system, the diverted flow of liquid, resulting from the response to the control conditions, may be availed of directly for accomplishing the regulating function, or may be utilized indirectly for that purpose by causing said diverted flow to vary the vacuum action of pneumatic operating means and thus produce the regulation of the function sought to be controlled.

With the foregoing general objects in view, the invention will now be described by reference to the accompanying drawing illustrating practical and efficient arrangements and constructions for accomplishing those objects, after which those features and combinations deemed to be novel and patentable will be particularly set forth and claimed.

In the drawing—

Figure 1 is a sectional elevation illustrative of a control system or apparatus constructed in accordance with the present invention;

Figure 2 is an enlarged sectional detail view, representing a section taken on the line 2—2 of Figure 1; and Figure 3 is another view in sectional elevation illustrating a modified application of the control principle embodied in my invention.

Most regulating means of the type to which the present invention relates comprise control linkage or transmission means having uninterrupted mechanical connection with the mechanism whose operation is to be controlled or regulated, thereby necessitating some mechanical effort to be transmitted directly through the medium of the control element to said mechanism in order to carry out the required control or regulating function. Obviously this method of operation, requiring the control element itself to serve as a medium of transmission of the mechanical effort necessary to effect the mechanical movement of the controlled or regulated mechanism restricts the freedom of operation of the control element in a manner which limits to the same degree the sensitivity of its control function.

The present invention accordingly aims to eliminate all direct mechanical connection between the control element and the regulated mechanism designed to be subject to its control or regulating action, thereby leaving the control element subject solely to the influence of its operative connection with the system of which it forms an essential part.

Referring now to the accompanying drawing, I have selected, as an example of an appropriate embodiment of the improved control means, certain parts of an automatic measuring mechanism, such as apparatus for feeding predetermined quantities of certain materials for a given purpose, as required, for example, in the adding of chemical materials to water in water purification systems. The type of apparatus herein shown is of the same general character as that illustrated in my copending application Ser. No. 529,765 filed April 6, 1944.

In the system illustrated, the apparatus comprises a balanced control beam 10 which is subjected to unbalancing means at a predetermined and controlled rate, as for example by being subjected to unbalancing impulses at such predetermined rate, which impulses are simultaneously transmitted to the weighing beam 12 of a scales mechanism supporting (as by connections 14) a receptacle 15 containing the material to be measured and dispensed by feeding means, such as a discharge valve 16, all as fully described in my said copending application.

One end of the control beam 10 is provided with a suitable operating connection 18 to an operating arm 20 attached to what may be termed a flow control pendulum 22 which is suspended from a fixed pivot 24 in the path of a flow of water or other liquid discharging from a pipe 26 leading from any suitable liquid supply pipe 28. The lower portion of this pendulum member 22 is of any practical design for producing a water spreading effect so that the liquid or water flow is spread out into somewhat fan contour at the entrance 30 to a waste pipe 32. This entrance portion of the waste pipe 32 also encloses the mouth 34 of an air choke tube 36 leading to an air trap receptacle 38 which is in turn connected with a water jet device 40 forming part of the water supply line 28. One side of the mouth portion 34 of the air choke tube 36 is beveled or tapered off as indicated at 34' in the direction of the pendulum member 22, with which it is in substantial alinement and thereby adapted for dividing or splitting the liquid flow in an effective manner.

The receptacle 38 is also provided with a flexible tube or hose connection 44 with a Sylphon type of bellows device 46 having an operative connection 48 with the aforesaid valve 16 which controls the feeding action or discharge of material from the container or receptacle 15. The bellows device may be supported by a fixed bracket 50 attached to said receptacle 15 or other stationary part; and between said bracket and an adjustable nut 52 on the valve operating link 48 is mounted a coil spring 56 whereby the valve is maintained normally in closed position as regards any discharge of the liquid material from the receptacle 15. This moreover represents the operative relationship of the control mechanism corresponding to such limited flow of water admitted to the air choke tube 36 as will produce no more than a negligible or inoperative vacuum in the air hose connection 44 and said bellows device 46.

The operative connection between the pendulum element 22 and the control member 10 is such that movement of the latter will cause the pendulum to swing into a position for diverting a greater or less portion of the water flow away from the remainder of said flow and into the mouth of the air choke tube 36. For example, as the tip of the control beam 10 is depressed the pendulum 22 is caused to swing to the left, thereby increasing the portion of the liquid flow which is diverted into tube 36 and thus to a greater degree choking the air flow therethrough and resulting in more air being withdrawn from the tube 44 and bellows device 46 and thus producing an opening movement of the valve 16, which corresponds to the type of control or regulating action designed to take place in response to the aforesaid movement of the control beam 10.

On the other hand, a movement of the control beam in the opposite direction will cause said pendulum element 22 likewise to undergo a reverse movement, which will obviously diminish the liquid flow through the tube 36 so that the air flow therethrough will be to that extent increased, and less air will be withdrawn from the tube 44 and bellows device 46, representing therefore a diminishing vacuum action, which allows an automatic closing movement of the valve 16 to take place, as the appropriate regulating effect designed to be produced by said reverse movement of the control member.

It will thus be seen that with an arrangement and construction as above described, there is no mechanical linkage between the flow control member 22 and the direct operating connections to the valve 16, whereby any mechanical effort is transmitted to or from or through the medium of the control element 22, the sole function of which is to vary the extent of liquid flow taking place through the mouth or entrance to the air choke tube 36; consequently, the control pendulum is left entirely free for untrammeled movement in response to the action of the control beam 10, and hence the latter is likewise free for a maximum sensitiveness of operation in the carrying out of the control function.

Any suitable liquid may of course be used for the flow medium, such as oil or mercury; and in lieu of using a waste pipe, the liquid may be collected and recirculated by an arrangement such as that illustrated in Figure 3. In this modified form of apparatus, the flow control element 22' is actuated by its arm 20' and control link 18' (responsive through suitable connections 10' to any source of control impulses) for controlling the flow of liquid which is recirculated by a pump 60 operated by a suitable motor 62. Here the control element 22' divides the liquid flow between a collecting chamber 63 and a float chamber 64 on opposite sides of a partition 34'', and said float chamber containing a float 65 having operating connections 66 to the valve 16' to be regulated. A small leak orifice 68 provides for drainage from the float chamber into the collecting chamber to a level at which the valve will remain closed on stoppage of the flow from the control element 22' into the float chamber; but at other levels, above the valve closing level, the float will be completely responsive to the extent of liquid flow diverted into the float chamber for correspondingly regulating the action of the valve 16'. Thus the diverted liquid itself, in this instance, serves as the actual mechanical means for effecting operation of the valve regulating means.

It will therefore be apparent from the foregoing that I have provided a very efficient and highly sensitive type of control system for the desired purposes; and one very outstanding advantage of the same is its adaptability for practically any arrangement of the related parts, whereby the controlled mechanism may be remotely located relative to the essential control elements. Moreover the type of mechanism from which the control impulses are derived may be of very great variety; as, for example, temperature or pressure measuring or registering devices, float-operated appliances, as well as liquid or gas flow registering means, and the like, all of which include some well known form of operative element or means adapted to serve as the control source as well as medium of connection to the control member of the present system.

Therefore while I have illustrated very apt and highly satisfactory examples of the application of said improved system in actual practice, I desire to be understood as reserving the right to make all such changes or variations as may properly come within the spirit and scope of my invention as defined by the following claims.

Having thus described my invention, what I claim is:

1. Control mechanism of the character described comprising, in combination with a mechanical operating or transmitting member provided with vacuum operating means, means for maintaining a continuous liquid flow, and a liquid flow control element responsive to external control impulses and operative to divert proportionate amounts of the liquid flow for correspondingly varying the vacuum action of said operating means and thereby regulate the operation of said transmitting member.

2. Control mechanism of the character described comprising, in combination with a mechanical operating or transmitting member provided with vacuum operating means, means for maintaining a continuous liquid flow and having an air choking connection to said vacuum operating means, and a liquid flow control element responsive to external control impulses and operative to divert proportionate amounts of the liquid flow to said air choking connection for correspondingly varying the vacuum action of said operating means and thereby regulating the operation of said transmitting member.

3. Control mechanism of the character described comprising, in combination with a mechanical operating or transmitting member provided with vacuum operating means, means for maintaining a continuous liquid flow and having an air choking connection to said vacuum operating means, and flow control means comprising a flow diverting member responsive to external control impulses and mounted for free movement in the path of said liquid flow for diverting proportionate amounts thereof to said air choking connection and correspondingly varying the vacuum action of said vacuum operating means and thereby regulating the operation of said transmitting member.

4. Control mechanism of the character described comprising, in combination with a mechanical operating or transmitting member provided with vacuum operating means, means for maintaining a continuous liquid flow and having an air choking connection to said vacuum operating means, and a flow regulating pendulum member responsive to external control impulses and suspended for free movement in the path of said liquid flow for diverting proportionate amounts thereof to said air choking connection and correspondingly affecting the vacuum action of said vacuum operating means and thereby regulating the operation of said transmitting member.

5. Control mechanism of the character described comprising, in combination with a mechanical operating or transmitting member provided with vacuum operating means, means for maintaining a continuous liquid flow, a flow regulating member responsive to external control impulses and suspended for free swinging movement in the path of said liquid flow for diverting proportionate amounts of said liquid flow from the remainder of said flow, and an air choking connection communicating with said vacuum operating means and provided with a mouth or receiving opening in position for receiving the diverted flow of liquid and thereby correspondingly affecting the operative vacuum of said vacuum operating means and also regulating the operation of said transmitting member.

ELMER E. HARPER.

REFERENCES CITED

The following references are of record in the file of this patent:

UNITED STATES PATENTS

| Number | Name | Date |
| --- | --- | --- |
| 1,966,638 | Morgan | July 17, 1934 |
| 2,151,143 | Pardee | Mar. 21, 1939 |
| 2,158,985 | Peet | May 16, 1939 |
| 2,187,656 | Kiep | Jan. 16, 1940 |
| 2,289,440 | Kugel | July 14, 1942 |
| 2,379,183 | Price | June 26, 1945 |